United States Patent [19]

Hessenthaler

[11] 4,061,461
[45] Dec. 6, 1977

[54] COMPOUND EXTRUSION DIE FOR PRODUCING AN INTERNALLY LINED EXTRUDATE

[75] Inventor: Herbert C. Hessenthaler, Bridgewater, N.J.

[73] Assignee: Thermoplastice Processes Inc., Stirling, N.J.

[21] Appl. No.: 684,500

[22] Filed: May 10, 1976

[51] Int. Cl.² ............................................ B29D 23/04
[52] U.S. Cl. .................... 425/462; 264/173; 425/72 R; 425/133.1; 425/467
[58] Field of Search ...................... 425/97, 107, 133.1, 425/380, 381, 466, 467, 326 R, 72 R, 387 R, DIG. 234, 462; 264/209, 95, 171, 173, 241, 245

[56] References Cited

U.S. PATENT DOCUMENTS

| | | | |
|---|---|---|---|
| 3,266,093 | 8/1966 | Corbett | 425/133.1 |
| 3,321,805 | 5/1967 | Given | 425/72 X |
| 3,546,743 | 12/1970 | Roth | 425/133.1 |

Primary Examiner—Francis S. Husar
Assistant Examiner—Mark Rosenbaum
Attorney, Agent, or Firm—Howard R. Popper

[57] ABSTRACT

An extrusion die is disclosed for producing a compound extrusion in the form of a lined tubing where the materials forming the main tubing wall and the lining are difficult to bond. The die includes a plenum chamber in which there is spider-mounted a torpedo section passed which the main extrudate flows. The torpedo section is equipped with the circumferential orifice for orthogonally injecting the secondary extrudate as an internal lining. The combined extrudate is then caused to flow through a conical passageway which increasingly confines the combined extrudate and enhances the bonding therebetween. Thereafter, the combined extrudate passes through a passgeway having a constant clearance dimension wherein the bonded materials are stablized before they are permitted to exit the die.

8 Claims, 2 Drawing Figures

COMPOUND EXTRUSION DIE FOR PRODUCING AN INTERNALLY LINED EXTRUDATE

BACKGROUND OF THE INVENTION

This invention relates to extrusion dies and more particularly to an extrusion die for producing a lined extrudate or a compound extrusion of two materials.

The extrusion of materials, particularly thermoplastic materials, is a highly developed art. Dies are available, for example, for producing not only rods and tubes but special shapes having almost any type of cross section. In addition, shapes having inlays, overlays and striations may be produced. Most of the available dies, however, have been designed for extrudates that are of chemically and physically compatible materials and where two materials have been so simultaneously extruded the purpose has been to obtain the other incidental benefits such as different color or the different resistance to the environment that the two materials may exhibit. Thus, "candy-striped" tubing, color-coded insulation sleeves for electrical wires and tubing that is both gasoline and water-resistant have been produced heretofore.

With respect to the extrusion of materials having different melting points, dies are known such as that disclosed in M. J. Drabb U.S. Pat. No. 3,538,547 issued Nov. 10, 1970, which shows a wire die for simultaneously extruding a coating of polyvinylchloride (PVC) having a melting point of 380°-390° F., but which burns at 410° F., and an overjacket of nylon having a melting point of 450°-500° F. The Drabb patent die is able to achieve co-extrusion of these materials requiring such divergent temperatures by thermally insulating the respective extrusion orifices from each other within the die head so that each may operate at its proper temperature. On the other hand, Dimitroff U.S. Pat. No. 3,640,659 issued Feb. 8, 1972, purports to overcome the temperature difference problem of the two extrudates (poly-ethylene having a melting temperature of 210°-225° C. and polyvinylidine chloride ("SARAN") having a melting temperature of 130°-140° C.) by merging the two extrudate streams after they exit the die orifices.

Techniques are also known for attempting to cope with the problem of bonding dissimilar resins. For example, an intermediate resin compounded of the two dissimilar materials may be extruded to form a three-layer sandwich as disclosed in Maillard et al U.S. Pat. No. 3,561,493. Another technique is shown in L. Klenk et al U.S. Pat. No. 3,486,196 which suggests that materials extruded in the form of concentric tubes may be bonded after emerging from the die orifice by stretching one of the extrudates with respect to the other or by what is referred to therein as "internal calibrating".

Recently, the public has become concerned with the level of certain chemicals in the environment. Vinyl chloride has been identified in the public mind as a particularly hazardous chemical. In the food and beverage industry, which makes extensive use of PVC tubing and piping, the concern has been voiced whether this plastic material itself may exhibit some of the dangers of vinyl chloride or whether it may under various ambient conditions or exposures exude free vinyl chloride even to the slightest degree. In addition to the vinyl chloride which is used in fabricating the basic polyvinylchloride resin used in the extrusion of the PVC tubing, plasticizers such as benzyldiethylhexylpthylate and stabilizers such as soy bean oil or epoxy are used. Depending upon the manufacturing process, some of these ingredients may not be fully incorporated and under extreme conditions there is concern that some of these ingredients may leach out into the food or liquid stream carried by the PVC piping. Although the level of free vinyl chloride that may exist in a finished article of PVC may be undetectable without the use of sensitive instruments, the public concern has nevertheless led some manufacturers of food dispensing and vending machines to search for materials to substitute for PVC.

One of the substitute materials that has been tried is ethylene vinyl acetate (EVA). Tubing made of EVA contains no vinyl chloride, and usually no plasticizer or stabilizer is necessary. Accordingly, EVA tubing appears to have no materials in its make-up that may be the subject of suspicion from the health safety viewpoint. Unfortunately, EVA tubing does not have the same resistance to discoloration and abrasion in handling as does PVC tubing. This characteristic is particularly troublesome in the vending machine industry because many local health department inspectors charged with examining food vending machines have adopted a priori rules according to which a machine may be given an unsatisfactory rating when its food or potable liquid conducting tubings appear to be "dirty". As a result, EVA tubing which is basically clean and sanitary and thoroughly serviceable may nevertheless be the cause for a local health department inspector condemning the machine because of the tubing's external appearance. Accordingly, the food handling industry has generated a need for a clear plastic tubing that has good mechanical properties, resistance to abrasion, grease, and dirt collection and which cannot leach or exude undesirable chemicals into the food or other liquids carried therethrough.

It was initially thought that tubing with the desirable physical characteristics of PVC and none of its suspected health hazards might be fabricated by a co-extrusion of PVC and EVA with the EVA forming an internal lining to the PVC such that the food or other liquid stream carried by the tubing could be exposed only to the EVA and could not come into contact with the PVC. Such a material would have PVC on the outside to resist abrasion and discoloration or "dirtying" by routine handling and EVA on the inside for its presumably safer characteristics from the health standpoint. However, the fabrication of such a compound tubing posed a great problem because of the difficulty of achieving good bonding between the EVA and the PVC. Tubing in which the EVA and PVC walls are not firmly bonded may appear to exhibit cloudy areas where there is poor contact between the materials and such cloudy or bubbly tubing will not be acceptable.

Additional problems are encountered in attempting to produce a compound tubing where the EVA forms only a thin-walled lining on the interior of a heavier-walled PVC hose. If it is attempted to extrude the PVC externally to an upstream-extruded EVA tube, the different required material flow rates preclude economical operation. If conventional dies are used, the bonding problem remains to be solved. Accordingly, the need has developed for a die capable of extruding EVA lined PVC tubing at useful production rates and which can assure good bonding of the two materials.

SUMMARY OF THE INVENTION

In accordance with an illustrative embodiment of the invention, a compound extrusion die has been produced which can deposit a relatively thin lining or shield of EVA on the interior surface of a simultaneously extruded heavier-walled PVC tubing. The simultaneously extruded tubes are thoroughly bonded to each other within the die and are substantially, if not entirely, free of bubbles, streaks, or cloudy, unbonded areas.

The compound die of the illustrative embodiment of the invention includes a main throat or plenum having a torpedo-shaped section, spider-mounted therein. PVC is extruded into the plenum chamber opposite the upstream face of the torpedo section. The downstream face or end of the torpedo section is fitted with a compound-tapered tailpiece, the larger diameter of the tailpiece facing the downstream end of the torpedo section. At the mating surfaces of the torpedo section and the tailpiece, a circumferential orifice is provided for orthogonally injecting the secondary extrudate (EVA) into the interior of the main stream of the PVC extrudate. Advantageously, an eccentrically positioned half-toroid is cut in the face of the torpedo section that mates with the tailpiece to provide a pressure-compensating reservoir for the secondary extrudate. The reservoir communicates with the circumferential orifice and compensates for the pressure drop in the supply of the secondary extrudate as distance varies from the secondary extrudate supply pipe. The reservoir is supplied via a supply pipe bored through one of the spider legs of the torpedo section.

The tailpiece diameter tapers from the circumferential orifice throughout a first portion of its downstream length to a second constant-diameter portion which extends to the die exit face. The combined extrudate is forced to conform to the tapering and thereafter to the constant diameter sections of the tailpiece by a conforming collar section which surrounds the tailpiece and which thereby subjects the combined extrudates to increasing compression in its first downstream length and thereafter to thermal stabilization in its subsequent downstream length. The passageway between the tapered tailpiece and the collar section is advantageously increasingly conical so as to provide an increasingly constricted orifice for the passage of the combined extrudate.

Further in accordance with an aspect of the construction of the illustrative die embodiment, another one of the spider legs securing the torpedo section in the main throat may be bored to provide an air-injection passage to the center of the tailpiece so that the compound tubing may be subjected to some internal air pressure as it passes through and upon emergence from the die to draw-off rollers.

BRIEF DESCRIPTION OF THE DRAWING

The foregoing and other objects and features of my invention may become more apparent from the ensuing detailed description and drawing in which:

Referring now to FIG. 1 a longitudinal cross-sectional view has been taken which shows plenum collar 6, torpedo section 7, tailpiece 8, collar 9 and make-up coupling 10. The plenum collar 6 connects to an extruder screw (not shown) via flange 61 which may be secured to the extruder by bolting or by the use of a threaded collar (not shown).

Figure 1:
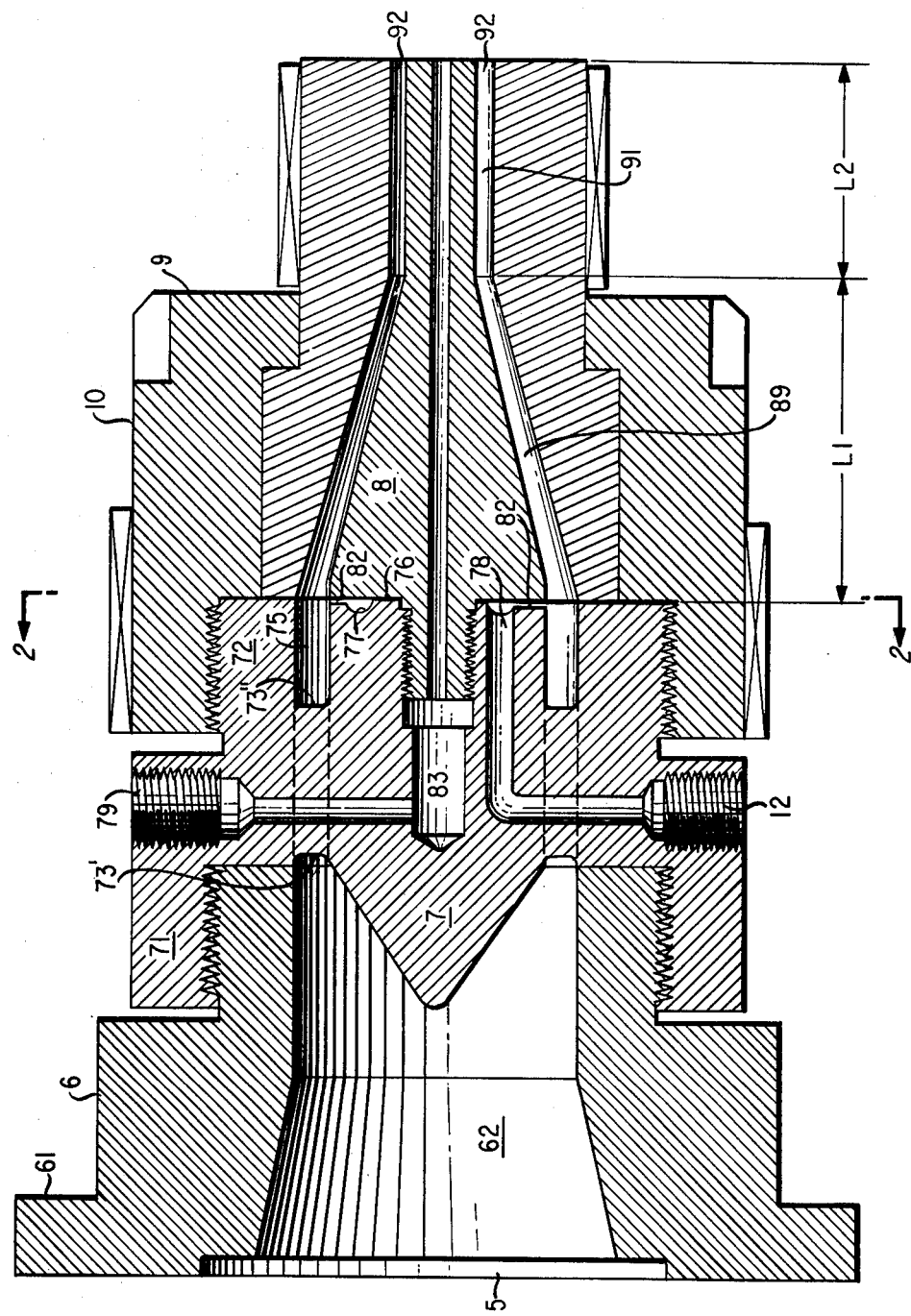
FIG. 1 shows a longitudinal, cross-sectional view through an illustrative embodiment of my compound-extrusion die.

Plenum chamber 62 of collar 6 is designed in known fashion to have a large enough volume so as to deliver a quantity of extrudate sufficient for the main wall thickness of the finally extruded tubing at the desired production rate. In the illustrative embodiment, the main extrudate entering at port 5 from the, preferably, in-line extruder screw (not shown) is polyvinyl chloride.

Interposed at the downstream end of plenum chamber 62 is torpedo section 7 which is supported in coaxial alignment with the bore of chamber 62 by means of web sections 73 (see FIG. 2), advantageously four in number. The web sections 73 in turn are integral with threaded inlet cuff section 71 and threaded outlet cuff section 72. The annular passageways 74 between web sections 73 permit the extrudate to flow from plenum chamber 62 downstream to annular chamber 75. The transmission passages 74 may be formed using any well-known fabrication technique suitable for working in steel such as drilling or broaching. In annular chamber 75 the main extrudate which is split into four streams by the upstream edges 73' of web section 73 reunites as it flows beyond the downstream edges θ" of the web section 73.

Figure 2:
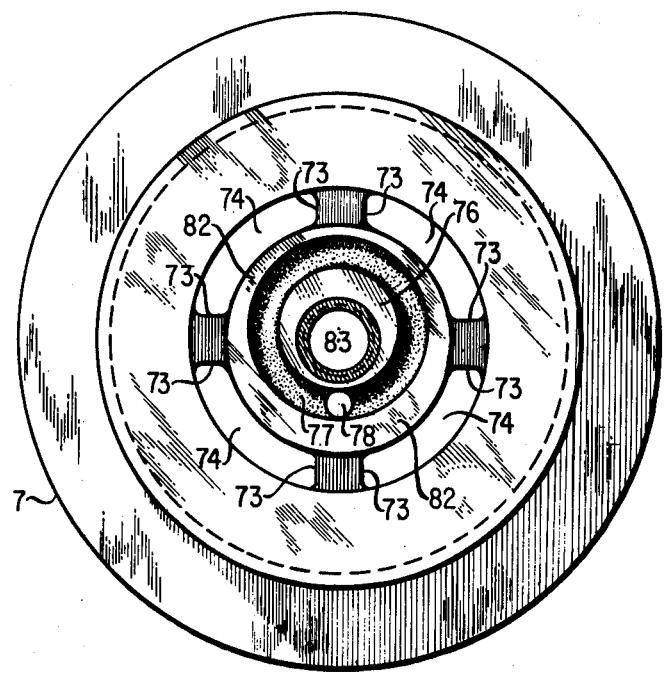
FIG. 2 shows the downstream end view of the torpedo section of the die.

The downstream surface 76 of torpedo section 7 is provided with a half-toroidal or semiannular reservoir 77 which is not concentric to the longitudinal axis of the torpedo section. Referring to FIG. 2, semiannular reservoir 77 is seen to be radially offset toward the two upper passageways 74 which are remote from the secondary extrudate supply orifice 78. Radially outward of semiannular reservoir 77 the downstream surface is recessed (see FIG. 1) to define a flow apron 82. The radial offset provides apron 82 with a longer radial length in the vicinity of orifice 78 and a shorter radial length remote from orifice 78 to compensate for the drop in pressure of the secondary extrudate with increasing distance from orifice 78. The degree of longitudinal axial recess between surface 76 and flow apron 82 determines the wall thickness of the secondary extrudate which will provide the inner lining or coating on the main tubing wall being formed from the main extrudate.

Secondary supply orifice 78 is connected at its end remote from semiannular reservoir 77 with supply pipe 12 through which the secondary extrudate, ethylene vinyl acetate in the illustrative embodiment, is supplied under pressure from a crosshead extruder (not shown).

Coupled to threaded outlet cuff 72 of torpedo section 7 is make-up coupling 10 which maintains nozzle 9 in registration with the outer diameter of annular chamber 75. Tailpiece 8 is threaded into central bore 83 of torpedo section 7 and is therefore in coaxial alignment therewith. Central bore 83 communicates with air supply pipe 79 into which are under pressure may be pumped if requied. The outer surface of tailpiece 8 tapers throughout its axial length L1 downstream of surface 76 as does the inside diamter of nozzle 9 throughout the same length. Advantageously, the degree to which nozzle 9 so tapers throughout length L1 is somewhat greater than the degree of taper of tailpiece 8 throughout this length so that the space between them actually forms an increasingly constricted, generally conical, passageway 89 as the downstream distance throughout length L1 (measured from face 76) increases. I have found that this increasingly constricted conical passageway 89 tends to improve the bonding between the principal and secondary extrudates which improvement is especially advantageous when extruding materials such as polyvinyl chloride and ethylene vinyl acetate whose bonding has heretofore been troublesome.

Throughout the final axial length portion L2 of tailpiece 8 and nozzle 9 these elements have outside and inside diameters, respectively, which are of constant size and which consequently define therebetween an after-throat portion 91 which provides a passageway of uniform size. The uniform afterthroat portion 91 which follows the increasingly constricted conical passageway 89 serves to stabilize the adhesion of the main and secondary extrudates which adhesion has been "forced" to take place during the passage of the extrudates through length L1. Upon exiting the die at exit port 92, the combined extrudate may, as is well known, undergo some change in diameter, but the adhesion of the primary and secondary extrudates remains unimpaired. A suitable distance downstream of exit port 92 the combined extrudate may be passed through a cooling bath and fed through take-up rollers (both not shown) in customary fashion. In addition, air may be supplied through pipe 79 and central bore 83 to assist in stabilizing the dimensions of the tubing after exiting the die.

The illustrative embodiment has been shown for producing extruded tubing having a maximum outside diameter somewhat smaller than the inside diameter of plenum chamber 62. It will be apparent to those of skill in the art that tubing having an outside diameter larger than that of the inside diameter of plenum chamber 62 may be obtained in accordance with my invention by reversing the taper of both tailpiece 8 and nozzle 9 throughout length L1 so that the taper of these pieces increases throughout downstream length L1.

In an illustrative embodiment of my invention in which tubing with a nominal wall thickness of 1/16 inch was produced having an OD of ⅜ inch, length L1 was 2 inches long and tailpiece 8 tapered from a major diameter of 1.460 inches at the circumferential orifice adjacent apron 82 to a constant diameter of 0.330 inch at afterthroat 91. The internal diameter of nozzle 9 tapered from 2 inches at its upstream end to 0.550 inch at its downstream end. PVC resin at a temperature of 350° and a pressure of 1500 psi was introduced at entry port 5 at a flow rate of 70 lb/hr., ethylene vinyl acetate resin at a temperature of 350°, a pressure of 1000 psi and a flow rate of 12 lb/hr. It will be apparent that further and other modifications may be constructed without departing from the spirit and scope of my invention.

What is claimed is:

1. An extrusion die for producing a bonded extrudate of two thermoplastic materials comprising a main extrusion passageway having an annular cross-section for transporting a first extrudate stream and an increasingly constricted conical passageway joining said main passageway, a radial orifice intermediate and orthogonal to said main and said conical passageway for injecting a secondary extrudate onto the inside of said first extrudate stream, said radial orifice being positioned adjacent the upstream end of said conical passageway and an afterthroat passageway of substantially constant cross-sectional throat size downstream of said conical passageway.

2. The invention of claim 1 wherein said conical passageway decreases in diameter downstream of said main passageway.

3. The combination of claim 1 further comprising a semiannular reservoir for receiving said secondary extrudate and said reservoir opening radially outwardly toward said radial orifice.

4. An extrusion die for simultaneous extrusion of two thermoplastic resins comprising a die body having a plenum chamber therein for receiving a first thermoplastic resin stream,
a torpedo section having one end thereof disposed within said plenum chamber,
an elongated tapering tailpiece coupled to the end of said torpedo section remote from said plenum chamber,
circumferential orifice means disposed about said torpedo section at the junction with said tailpiece section, said orifice means being adapted to dispense a second thermoplastic resin,
an entry port in said torpedo section for introducing said second thermoplastic resin,
reservoir means communicating with said circumferential orifice means and said entry port and eccentrically positioned with respect to said orifice means to compensate for differential pressure drop of said second resin in following from said entry port to said orifice means, and
a tapering throat section disposed aft of said circumferential orifice means and conformably containing said tailpiece and provided a channel for the passage of said first and second resins.

5. An extrusion die for producing a bonded extrudate of two thermoplastic materials comprising a main extrusion passageway having an annular cross-section for transporting a first extrudate and an increasingly constricted conical passageway joining said main passageway, a radial orifice intermediate and orthogonal to said main and said conical passageway for injecting a secondary extrudate into the stream of said first extrudate, a semi-annular reservoir communicating with said radial orifice for receiving said secondary extrudate, said semiannular reservoir being offset with respect to the longitudinal axis of said main passageway, and an afterthroat passageway of constant size downstream of said conical passageway.

6. The invention of claim 5 wherein said main passageway is defined in the space between the surrounding walls of a plenum chamber and the outer periphery of a torpedo member supported within said plenum chamber.

7. The invention of claim 6 wherein said radial orifice is disposed at the downstream end of said torpedo member.

8. The invention of claim 7 wherein said increasingly constricted conical section is defined between the inside wall of a tapered nozzle piece abutting said main plenum chamber and the outside wall of a tapered tailpiece member, said tailpiece member being coaxial with said torpedo member and wherein the tapers of said tailpiece and said nozzle piece are of different degrees.

* * * * *